United States Patent
Rosenquist et al.

(10) Patent No.: US 8,726,850 B2
(45) Date of Patent: May 20, 2014

(54) PET COLLAR BREAKAWAY BUCKLE DEVICE

(75) Inventors: Scott J. Rosenquist, La Jolla, CA (US); Jennifer C. Weiler, San Diego, CA (US); Colette M. Hardin, San Diego, CA (US); Michelle A. Turgeon, Temecula, CA (US)

(73) Assignee: Petco Animal Supplies, Inc., San Diego, CA (US)

( * ) Notice: Subject to any disclaimer, the term of this patent is extended or adjusted under 35 U.S.C. 154(b) by 174 days.

(21) Appl. No.: 13/495,488

(22) Filed: Jun. 13, 2012

(65) Prior Publication Data

US 2013/0333634 A1 Dec. 19, 2013

(51) Int. Cl.
- *A01K 27/00* (2006.01)
- *A62B 35/00* (2006.01)
- *A44B 11/25* (2006.01)
- *A44B 11/26* (2006.01)
- *A44B 11/00* (2006.01)

(52) U.S. Cl.
CPC .......... *A01K 27/005* (2013.01); *A01K 27/001* (2013.01); *A44B 11/266* (2013.01); *A44B 11/2592* (2013.01); *A44B 11/006* (2013.01)
USPC .............................. 119/865; 119/863; 24/614

(58) Field of Classification Search
CPC .......................... A01K 27/005; A01K 27/001
USPC .................. 119/863, 865; 24/614, 615, 3.13
See application file for complete search history.

(56) References Cited

U.S. PATENT DOCUMENTS

| | | | |
|---|---|---|---|
| 4,569,106 A | | 2/1986 | Lovato |
| 4,779,315 A | * | 10/1988 | Kohus ................ 24/587.12 |
| 5,203,058 A | | 4/1993 | Krauss |
| 5,224,247 A | | 7/1993 | Collier |
| 5,735,024 A | * | 4/1998 | Ortiz ................ 24/573.11 |
| 6,571,434 B2 | | 6/2003 | Ortiz |
| 6,622,350 B2 | | 9/2003 | Austin et al. |
| 6,826,806 B2 | * | 12/2004 | Eaton et al. ........... 24/115 F |
| 7,290,313 B2 | | 11/2007 | Southern |
| 7,603,754 B2 | * | 10/2009 | Hayes et al. ........... 24/586.1 |
| 2003/0121129 A1 | * | 7/2003 | Hamilton ................ 24/615 |

* cited by examiner

*Primary Examiner* — Son T Nguyen
(74) *Attorney, Agent, or Firm* — Pillsbury Winthrop Shaw Pittman LLP

(57) ABSTRACT

The present disclosure relates to a pet collar breakaway buckle device configured to be worn around the neck of a pet. Certain pets may have a natural instinct to wander, climb, and/or squeeze in to small places. Pets that squeeze into small places may catch their collars such that the pet becomes stuck. The pet collar breakaway buckle device described herein may be configured to break away under the bodyweight of the pet, reducing the risk of strangling and/or other unintended injury to the pet. A pet owner and/or other person may apply a compressive load to the buckle device to attach the collar around the neck of a pet and a tensile load to remove the device from the neck of a pet. In some implementations, the pet collar breakaway buckle device may comprise a strap, a first interlocking clasp, a second interlocking clasp, and/or other components.

16 Claims, 5 Drawing Sheets

PET COLLAR BREAKAWAY BUCKLE DEVICE

FIELD

The present disclosure relates to a pet collar breakaway buckle device configured to be worn around the neck of a pet.

BACKGROUND

Various pet collars are known. Typically, a collar is a band of material fixed to the neck of a pet. A collar may be used to identify the animal as a pet, may be worn by a pet as an accessory, used to provide information that identifies the pet's owners, and/or used to restrain the pet. Multiple methods to connect a collar around the neck of a pet are known. Typical connectors include a male component and a female component that are configured to interlock. Commonly, the interlocking male and female components must be manually disconnected to remove the collar from the pet's neck.

SUMMARY

One aspect of the disclosure relates to a pet collar breakaway buckle device configured to be worn around the neck of a pet. The pet collar breakaway buckle device described herein may be configured to break away under the bodyweight of the pet, reducing the risk of strangling and/or other unintended injury to the pet. In some implementations, the pet collar breakaway buckle device may comprise a strap, a first interlocking clasp, a second interlocking clasp, and/or other components.

The strap is configured to flexibly wrap around the neck of the pet. A first end of the strap may be configured to be attached to the first interlocking clasp and a second end of the strap may be configured to attach to the second interlocking clasp.

The first interlocking clasp may be configured to attach to the first end of the strap and engage the second interlocking clasp. The first interlocking clasp may comprise a strap connector, a body, a protrusion, and/or other components.

The strap connector may be configured to connect to the first end of the strap. The strap connector may have a profile comprising an arcuate member and a columnar member. The arcuate member and the columnar member may be joined, creating a passage for the first end of the strap. In some implementations, the first end of the strap may pass through the passage in the strap connector and attach to itself such that the end of the strap forms a loop containing the columnar member.

The body may be configured to attach to the strap connector. The body may comprise a planar side, an arcuate side, and/or other components. The body may be configured to join the strap connector such that the planar side of the body intersects the strap connector substantially at or near the center of the arcuate member of the strap connector.

A lateral slot may be formed in the arcuate side of the body. The lateral slot may be configured with a lateral notch. The lateral slot may be configured with a larger cross-section at the lateral notch.

The protrusion may be connected to the body near the strap connector. The protrusion may be configured to have a default position. The protrusion may be formed from a resilient material such that the protrusion deflects under a load and returns to the default position responsive to cessation of the load. The protrusion may be configured to include a tab configured to protrude from the protrusion.

The second interlocking clasp may be configured to attach to a second end of the strap and engage the first interlocking clasp. The second interlocking clasp may comprise a strap connector, a body, a protrusion, and/or other components. The components of the second interlocking clasp may correspond to similar components in the first interlocking clasp. In some implementations, the first interlocking clasp and the second interlocking clasp may be geometrically the same.

During engagement between the first interlocking clasp and the second interlocking clasp, the lateral slots from each interlocking clasp may be configured to receive the protrusions of the other interlocking clasp in a sliding engagement. The lateral notches from each interlocking clasp may be configured to receive the tabs from the other interlocking clasp.

Engagement between the first interlocking clasp and the second interlocking clasp may be maintained by bias forces of the protrusions toward their default positions. The bias forces of the protrusions toward their default positions may hold the tabs in their respective notches.

Removing the collar device from the neck of a pet may require disengagement of the first interlocking clasp from the second interlocking clasp. Disengagement of the first interlocking clasp from the second interlocking clasp may be accomplished by applying a tensile load to the first interlocking clasp and the second interlocking clasp sufficient to cause the protrusions to deflect from their default positions. Deflection of the protrusions from their default positions may free the tabs from their respective lateral notches.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", "the" include plural referents unless the context clearly dictates otherwise.

DETAILED DESCRIPTION

Figure 1:
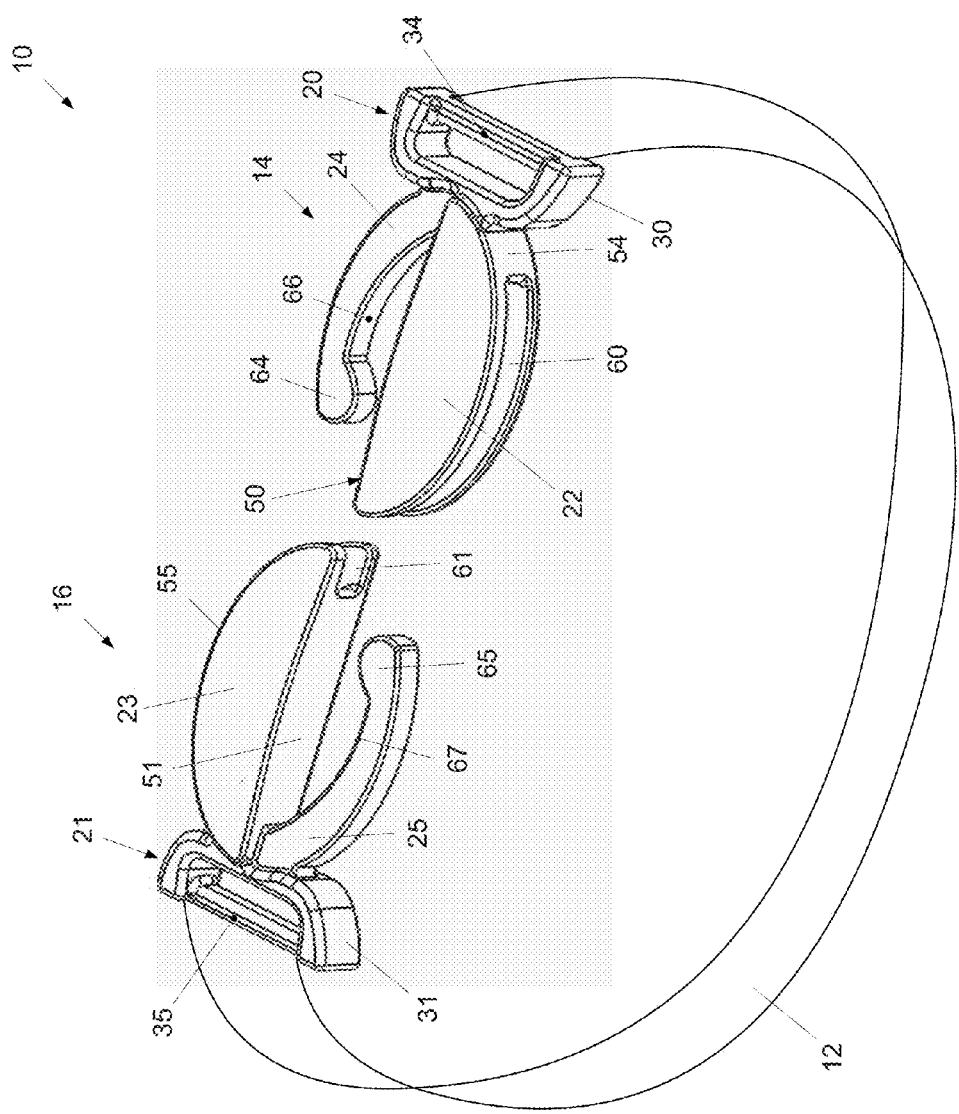
FIG. 1 is a schematic illustration of a pet collar breakaway buckle device configured to be worn around the neck of a pet.

FIG. 1 is a schematic illustration of a pet collar breakaway buckle device 10 configured to be worn around the neck of a pet. Certain pets (e.g., a cat) may have a natural instinct to wander, climb, and/or squeeze in to small places. Pets that squeeze into small places may catch their collars such that the pet becomes stuck. Pet collar breakaway buckle device 10 described herein may be configured to break away under the bodyweight of the pet, reducing the risk of strangling and/or other unintended injury to the pet. A pet owner and/or other person may apply a compressive load to buckle device 10 around the neck of a pet and a tensile load to remove device 10 from the neck of a pet. In some implementations, pet collar breakaway buckle device 10 may comprise a strap 12, a first interlocking clasp 14, a second interlocking clasp 16, and/or other components. It should be appreciated that although the present disclosure describes interlocking clasps 14, 16 as part of pet collar breakaway buckle device 10, the buckle formed by interlocking clasps 14, 16 may be useful in other applications such as belts, backpacks, purses, handbags, and/or other applications.

Strap 12 is configured to flexibly wrap around the neck of the pet. In some implementations, the length of strap 12 may be customized to the fit the neck of a specific pet. In some implementations, strap 12 may be adjustable. Strap 12 may be made from leather, a polymer based material (e.g., nylon), metal, and/or other materials. Strap 12 may be configured such that identification tags, a bell, and/or other accessories may be attached to strap 12. In some implementations, strap 12 may contain materials to reduce, eliminate, and/or prevent fleas, ticks, mosquitoes, and/or other pests. In some implementations, strap 12 may contain an electronic device configured to allow wireless electronic tracking of the pet wearing the collar device.

First interlocking clasp 14 may be configured to attach to a first end of strap 12 and engage second interlocking clasp 16. First interlocking clasp 14 may comprise a strap connector 20, a body 22, a protrusion 24, and/or other components.

Figure 2:
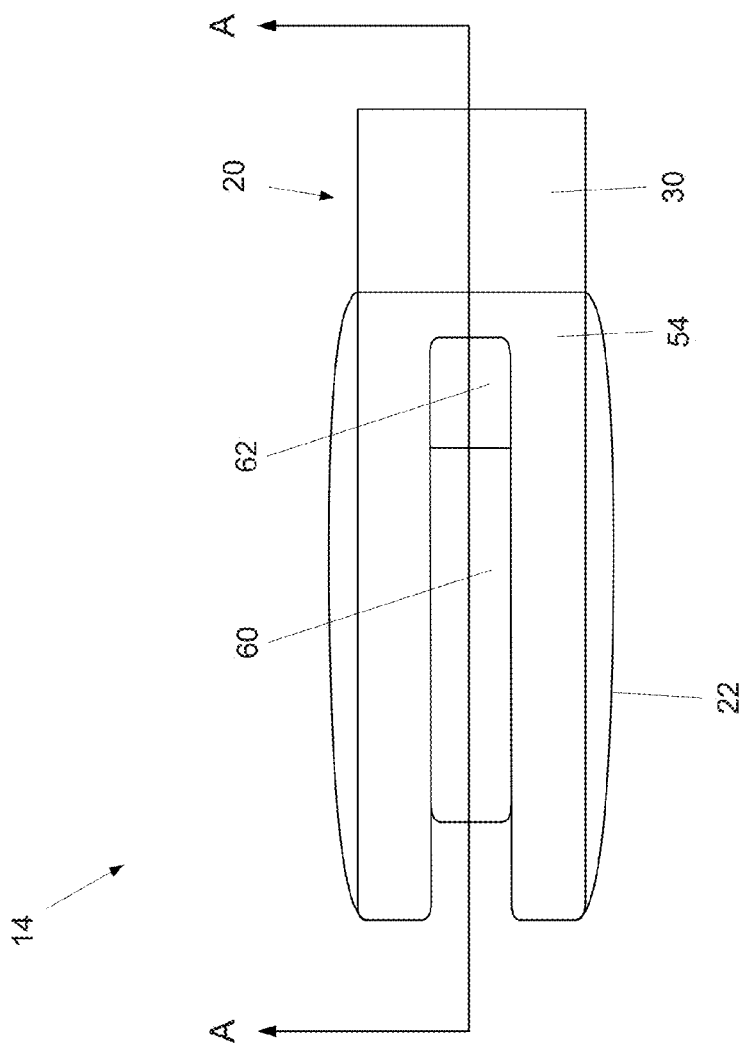
FIG. 2 is a side view of a first interlocking clasp.

FIG. 2 illustrates a side view of first interlocking clasp 14 oriented such that strap connector 20 and body 22 are visible. In this orientation, protrusion 24 (not shown) is located on the opposite side of first interlocking clasp 14. Section A-A is also shown in FIG. 2.

Figure 3:
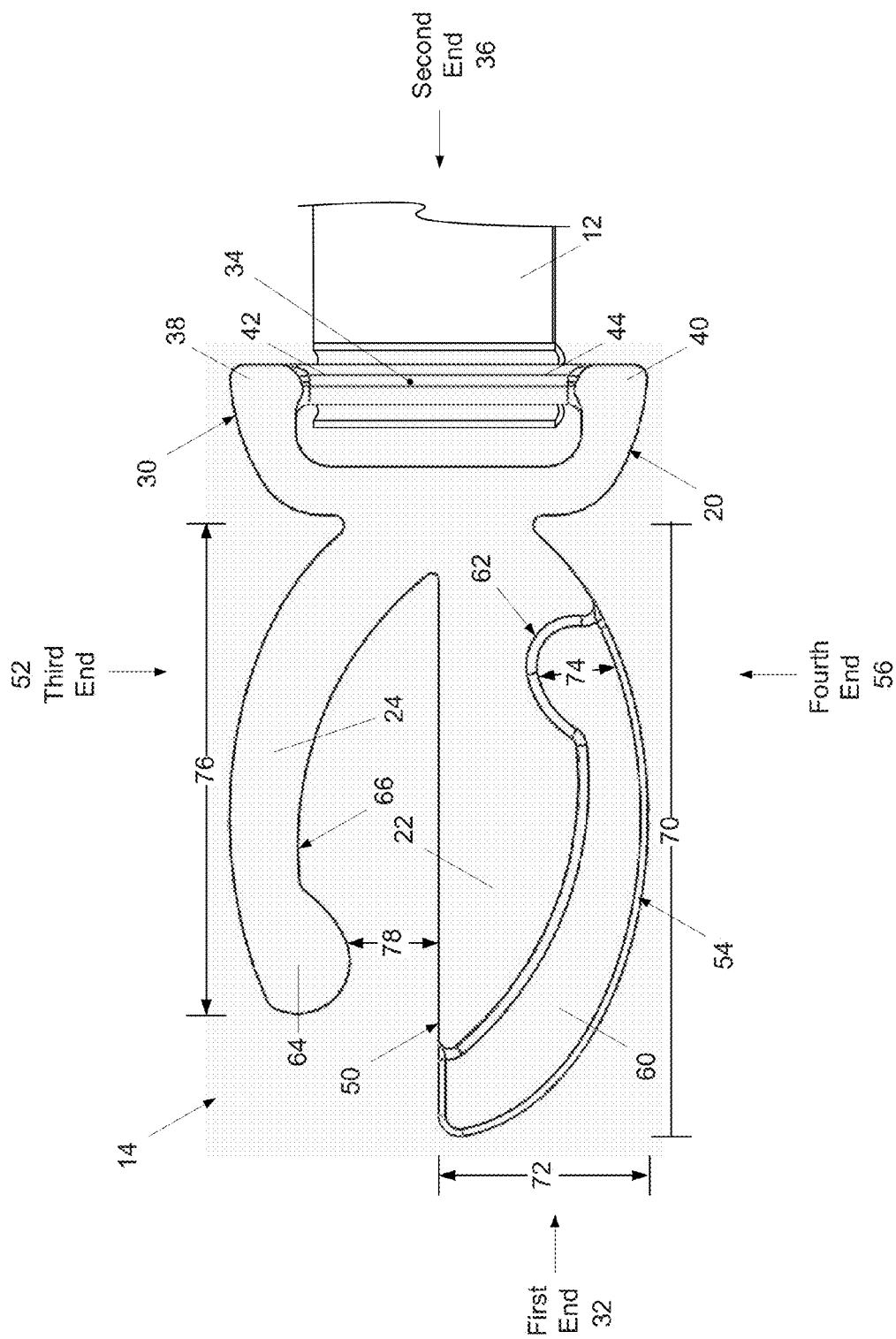
FIG. 3 illustrates a sectional view of a first interlocking clasp and an end of a strap.

FIG. 3 illustrates a sectional view (Section A-A shown in FIG. 2) of interlocking clasp 14 and an end of strap 12. Strap connector 20 may be configured to connect to the first end of strap 12. Strap connector 20 may have a profile comprising an arcuate member 30 toward a first end 32 of interlocking clasp 14 and a columnar member 34 toward a second end 36 of interlocking clasp 14. The ends 38, 40 of arcuate member 30 join the ends 42, 44 of columnar member 34 creating a passage for the first end of strap 12. In some implementations, the first end of strap 12 may pass through the passage in strap connector 20 and attach to itself such that the end of strap 12 forms a loop containing columnar member 34. In some implementations the attachment may be made by sewing, buttoning, gluing, forming a belt loop, and/or other methods of attachment.

Body 22 may be configured to attach to strap connector 20. Body 22 may comprise a planar side 50 toward a third end 52 of interlocking clasp 14, an arcuate side 54 toward a fourth end 56 of interlocking clasp 14, and/or other components. Body 22 may be configured to join strap connector 20 such that planar side 50 of body 22 intersects strap connector 20 substantially at or near the center of arcuate member 30. Body 22 may be configured to extend in the normal direction toward first end 32 from arcuate member 30 such that planar side 50 of body 22 lies in the normal direction toward first end 32. Arcuate side 54 may be located opposite planar side 50 toward fourth end 56. Body 22 may have a length 70 of less than about 1 inch. The length of body 22 may be between about 0.5 inches and 1 inch. The length of body 22 may be about 0.88 inches. Body 22 may have a width 72 of less than about 0.5 inches. The width of body 22 may be between about 0.1 inches and 0.5 inches. The width of body 22 may be about 0.31 inches.

A lateral slot 60 may be formed in arcuate side 54 from first end 32 of body 22 toward strap connector 20. Lateral slot 60 may be configured with a lateral notch 62. Lateral slot 60 may be configured with a larger cross-section at lateral notch 62. Lateral notch 62 may be located at the end of lateral slot 60 toward strap connector 20. Lateral notch 62 may have a maximum cross section 74 of less than about 0.3 inches. The maximum cross section of notch 62 may be between about 0.05 inches and 0.3 inches. The maximum cross section of notch 62 may be about 0.14 inches.

Protrusion 24 may be connected to body 22 toward second end 36 of body 22, near strap connector 20. Protrusion 24 may be configured to have a default position. Protrusion 24 may be formed from a resilient material such that protrusion 24 deflects under a load and returns to the default position responsive to cessation of the load. The resilient material may comprise one or more of an amorphous polymer, a semi-crystalline polymer, a superelastic metal (e.g., nitinol), and/or other polymer or non-polymer materials. Protrusion 24 may be configured with an arcuate profile. The length 76 of protrusion 24 may be less than about 1 inch. The length of protrusion 24 may be between about 0.5 inches and 1 inch. The length of protrusion 24 may be about 0.72 inches. Protrusion 24 may be configured to include a tab 64 configured to protrude from protrusion 24. Tab 64 may be located on an inside surface 66 of protrusion 24 facing planar side 50 of body 22. The distance 78 between tab 64 and planar side 50 may be less than about 0.3 inches. Distance 78 may be between about 0.05 inches and 0.3 inches. Distance 78 may be about 0.13 inches. The general shapes and approximate dimensions described herein with respect to buckle device 10 are not intended to be limiting. Buckle device 10 may comprise other shapes and/or dimensions that allow it to function as described in the present disclosure. By way of a non-limiting example, device 10 may be scaled smaller and/or larger for pets of different sizes.

Returning to FIG. 1, second interlocking clasp 16 may be configured to attach to a second end of strap 12 and engage first interlocking clasp 14. Second interlocking clasp 16 may comprise a strap connector 21, a body 23, a protrusion 25, and/or other components. As shown in FIG. 1, the components of second interlocking clasp 16 may correspond to similar components in first interlocking clasp 14. Strap connector 20, body 22, and/or protrusion 24 of first interlocking clasp 14 may correspond to strap connector 21, body 23, and/or protrusion 25 of second interlocking clasp 16. An arcuate member 31 and/or a columnar member 35 of strap connector 21 may correspond to arcuate member 30 and/or columnar member 34 of strap connector 20. A planar side 51, an arcuate side 55, and/or a lateral slot 61 of body 23 may correspond to planar side 50, arcuate side 54, and/or lateral slot 60 of body 22. Lateral slot 61 may include a lateral notch (not shown) that corresponds to lateral notch 62 of lateral slot 60 (shown in FIG. 3). A tab 65 located on an inside surface 67 of protrusion 25 may correspond to tab 64 on inside surface 66 of protrusion 24.

In some implementations, first interlocking clasp 14 and second interlocking clasp 16 may be geometrically the same. As such, the description of the arrangement, approximate dimensions, and/or functionality of each component of first interlocking clasp 14 described above with respect to FIG. 3 also applies to the corresponding components of second interlocking clasp 16.

Figure 4:
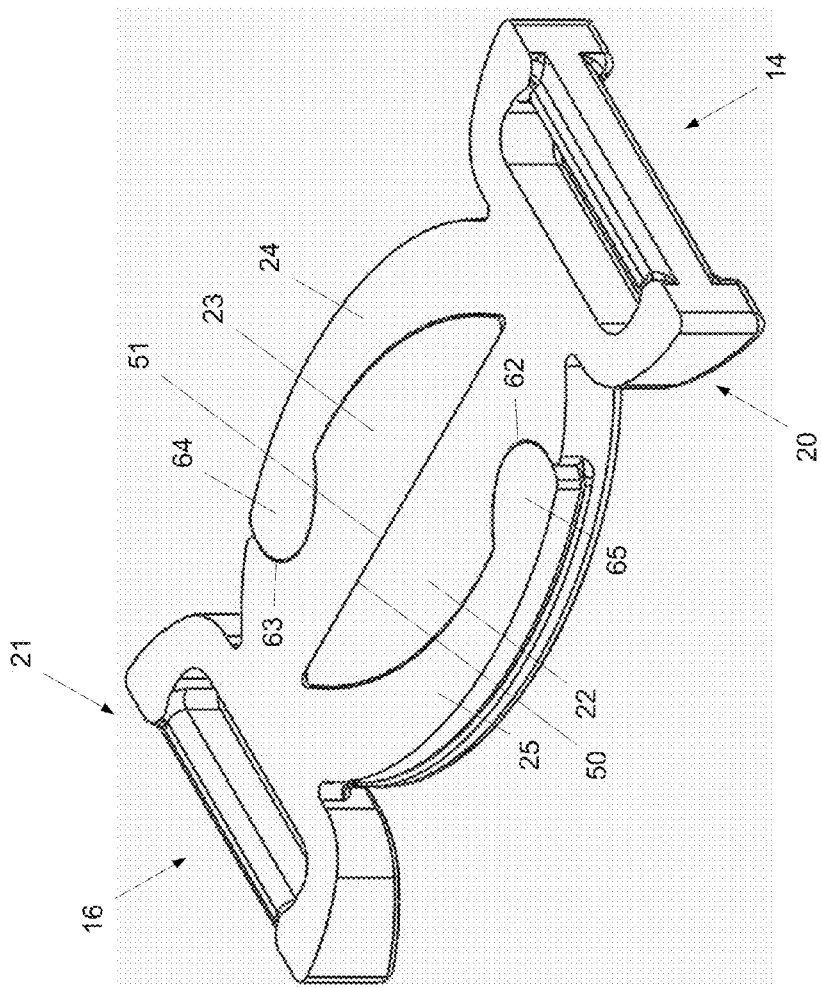
FIG. 4 shows a sectional view of a first interlocking clasp engaged with a second interlocking clasp.

FIG. 4 shows a sectional view of first interlocking clasp 14 engaged with second interlocking clasp 16. During engagement between first interlocking clasp 14 and second interlocking clasp 16, lateral slot 60 (shown engaged by protrusion 25) of first interlocking clasp 14 may be configured to receive protrusion 25 in a sliding engagement and lateral slot 61 (shown engaged by protrusion 24) of second interlocking clasp 16 may be configured to receive protrusion 24 in a sliding engagement. Lateral notch 62 may be configured to receive tab 65 and the corresponding lateral notch 63 in second interlocking clasp 16 may be configured to receive tab 64. Protrusion 24 may be configured to fit within lateral slot 61 (shown engaged by protrusion 24) and protrusion 25 may be configured to fit within lateral slot 60 (shown engaged by protrusion 25). Tab 64 may be configured to be seated within lateral notch 63 and tab 65 may be configured to be seated within lateral notch 62. Planar side 50 of body 22 and planar side 51 of body 23 may directly face each other when first interlocking clasp 14 and second interlocking clasp 16 are engaged.

Engagement between first interlocking clasp 14 and second interlocking clasp 16 may be maintained by bias forces of protrusion 24 and protrusion 25 toward their default positions. The bias forces of protrusion 24 and protrusion 25 toward theft default positions may hold tab 64 in lateral notch 63 and tab 65 in lateral notch 62, respectively.

Removing device 10 from the neck of a pet may require disengagement of first interlocking clasp 14 from second interlocking clasp 16. Disengagement of first interlocking clasp 14 from second interlocking clasp 16 may be accomplished by applying a tensile load to first interlocking clasp 14 and second interlocking clasp 16 sufficient to cause protrusion 24 and protrusion 25 to deflect from theft default positions. Deflection of protrusion 24 and protrusion 25 from their default positions may free tab 64 from lateral notch 63 and tab 65 from lateral notch 62, respectively.

In some implementations, the force required to disengage first interlocking clasp 14 from second interlocking clasp 16 may be greater than or equal to about 6 pounds. In some implementations, the force required to disengage first interlocking clasp 14 from second interlocking clasp 16 may be less than or equal to about 24 pounds. In some implementations, the force required to disengage first interlocking clasp 14 from second interlocking clasp 16 may be between about 6 pounds and about 24 pounds. In some implementations, first interlocking clasp 14 may disengage from second interlocking clasp 16 under the bodyweight of the pet. In some implementations, a pet owner and/or other person may apply the tensile load to remove device 10 from the neck of a pet.

Figure 5:
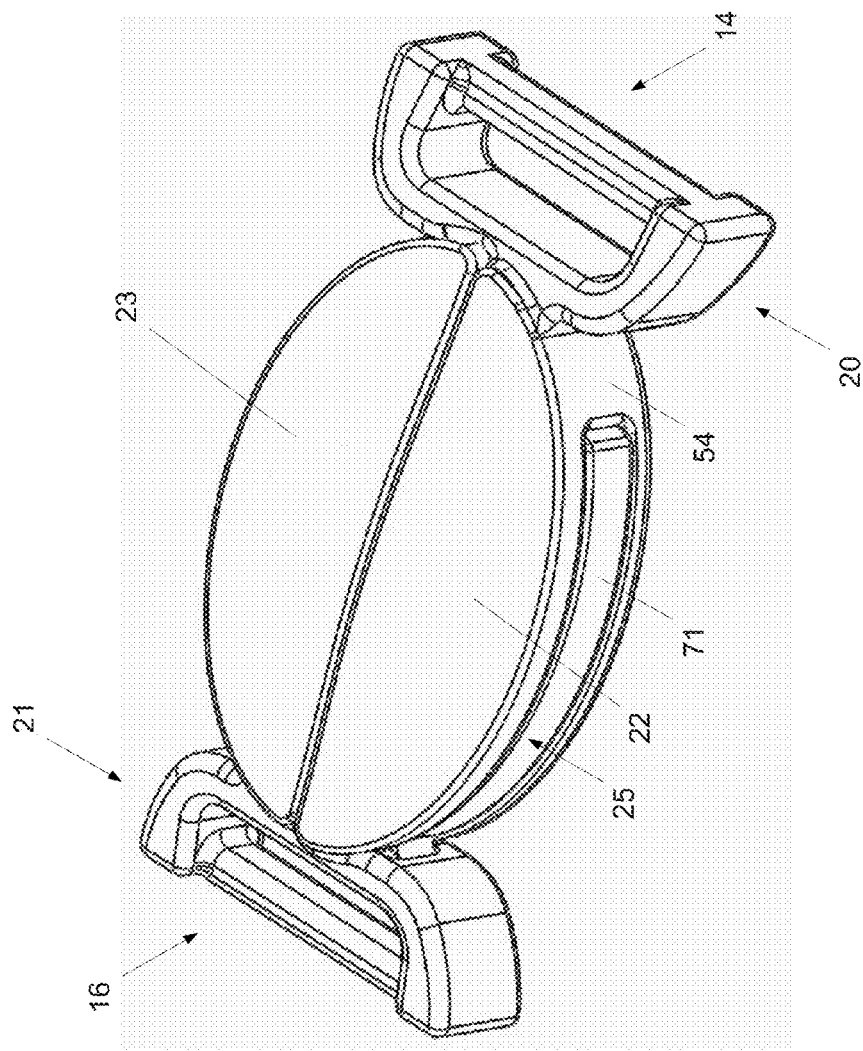
FIG. 5 illustrates the first interlocking clasp engaged with the second interlocking clasp.

FIG. 5 illustrates first interlocking clasp 14 engaged with second interlocking clasp 16. During engagement between first interlocking clasp 14 and second interlocking clasp 16, lateral slot 60 (shown engaged by protrusion 25) of first interlocking clasp 14 may be configured to receive protrusion 25. Protrusion 25 may be configured to fit within lateral slot 60 (shown engaged by protrusion 25). Protrusion 25 may be configured to fit within lateral slot 60 such that the arcuate profile of an outer surface 71 of protrusion 25 substantially matches the arcuate profile of arcuate side 54 of body 22. Similar engagement may occur between protrusion 24 and body 23 (not shown in FIG. 5).

In some implementations, as shown in FIG. 5, when clasps 14 and 16 are buckled, the resulting shape formed by bodies 22 and 23 may be generally elliptical. In some implementations, the resulting shape formed by bodies 22 and 23 may be generally circular. In some implementations, the resulting shape formed by bodies 22 and 23 may have a shape other than elliptical and/or circular.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A pet collar breakaway buckle device configured to be worn around the neck of a pet, the device comprising:
   a strap configured to flexibly wrap around the neck of a pet;
   a first interlocking clasp, the first interlocking clasp comprising:
      a first strap connector configured to connect to a first end of the strap;
      a first body attached to the first strap connector, the first body comprising:
         a first planar side; and
         a first arcuate side, the first arcuate side located opposite the first planar side;
         a first lateral slot formed in the first arcuate side from a distal end of the first body toward the first strap connector, the first lateral slot having a first lateral notch wherein the first lateral slot has a larger cross-section at the first lateral notch; and
      a first protrusion having a default position and being formed from a resilient material such that the first protrusion deflects under a load and returns to the default position responsive to cessation of the load;
      a first tab that protrudes from the first protrusion; and
   a second interlocking clasp configured to engage the first interlocking clasp, the second interlocking clasp comprising:
      a second strap connector configured to connect to a second end of the strap;
      a second body attached to the second strap connector, the second body comprising:
         a second planar side; and
         a second arcuate side, the second arcuate side located opposite the second planar side;
         a second lateral slot formed in the second arcuate side, the second lateral slot being configured to receive the first protrusion in a sliding engagement between the first interlocking clasp and the second interlocking clasp, the second lateral slot having a second lateral notch being configured to receive the first tab during engagement between the first interlocking clasp and the second interlocking clasp;
      a second protrusion configured to fit within the first lateral slot during engagement between the first interlocking clasp and the second interlocking clasp, the second protrusion having a default position and being formed from a resilient material such that the second protrusion deflects under a load and returns to the default position responsive to cessation of the load; and
      a second tab configured to be seated within the first lateral notch;
   wherein engagement between the first interlocking clasp and the second interlocking clasp is maintained by a bias force of the first protrusion and the second protrusion to their default positions holding the first tab in the second lateral notch and the second tab in the first lateral notch, respectively, and wherein disengagement of the first interlocking clasp from the second interlocking clasp is accomplished by applying a tensile load to the first interlocking clasp and the second interlocking clasp sufficient to cause the first protrusion and the second protrusion to deflect from their default positions, thereby freeing the first tab from the second lateral notch and the second tab from the first lateral notch, respectively.

2. The device of claim 1, wherein the first interlocking clasp and second interlocking clasp are geometrically the same.

3. The device of claim 1, wherein the tensile force necessary to disengage the first interlocking clasp and the second interlocking clasp is 6-24 pounds.

4. The device of claim 1, wherein the first strap connector has a profile comprising a first arcuate member on one side and a first columnar member on the opposite side, wherein the ends of the first arcuate member join the ends of the first columnar member, creating a passage for the first end of the strap, and wherein the second strap connector has a profile comprising a second arcuate member on one side and a second columnar member on the opposite side, wherein the ends of the second arcuate member join the ends of the second columnar member, creating a passage for the second end of the strap.

5. The device of claim 4, wherein the first body is joined to the first strap connector such that the first planar side of the first body intersects the first strap connector substantially at or near the center of the first arcuate member, and wherein the second body is joined to the second strap connector such that the second planar side of the second body intersects the second strap connector substantially at or near the center of the second arcuate member.

6. The device of claim 5, wherein the first body extends in the normal direction from the first arcuate member such that the first planar side of the first body lies in the normal direction, and wherein the second body extends in the normal direction from the second arcuate member such that the second planar side of the second body lies in the normal direction.

7. The device of claim 1, wherein the first and second protrusions have an arcuate profile.

8. The device of claim 7, wherein the first tab is located on a first inside surface of the first protrusion facing the first planar side of the first body, and wherein the second tab is located on a second inside surface of the second protrusion facing the second planar side of the second body.

9. A breakaway buckle device the device comprising
a first interlocking clasp, the first interlocking clasp comprising:
   a first body, the first body comprising:
      a first planar side; and
      a first arcuate side, the first arcuate side located opposite the first planar side;
      a first lateral slot formed in the first arcuate side from a distal end of the first body toward a proximal end, the first lateral slot having a first lateral notch wherein the first lateral slot has a larger cross-section at the first lateral notch; and
   a first protrusion having a default position and being formed from a resilient material such that the first protrusion deflects under a load and returns to the default position responsive to cessation of the load;
   a first tab that protrudes from the first protrusion; and
a second interlocking clasp configured to engage the first interlocking clasp, the second interlocking clasp comprising:
   a second body, the second body comprising:
      a second planar side; and
      a second arcuate side, the second arcuate side located opposite the second planar side;
      a second lateral slot formed in the second arcuate side, the second lateral slot being configured to receive the first protrusion in a sliding engagement between the first interlocking clasp and the second interlocking clasp, the second lateral slot having a second lateral notch being configured to receive the first tab during engagement between the first interlocking clasp and the second interlocking clasp;
   a second protrusion configured to fit within the first lateral slot during engagement between the first interlocking clasp and the second interlocking clasp, the second protrusion having a default position and being formed from a resilient material such that the second protrusion deflects under a load and returns to the default position responsive to cessation of the load; and
   a second tab configured to be seated within the first lateral notch;
wherein engagement between the first interlocking clasp and the second interlocking clasp is maintained by a bias force of the first protrusion and the second protrusion to their default positions, holding the first tab in the second lateral notch and the second tab in the first lateral notch, respectively, and
wherein disengagement of the first interlocking clasp from the second interlocking clasp is accomplished by applying a tensile load to the first interlocking clasp and the second interlocking clasp sufficient to cause the first protrusion and the second protrusion to deflect from their default positions, thereby freeing the first tab from the second lateral notch and the second tab from the first lateral notch, respectively.

10. The device of claim 9, wherein the first interlocking clasp and second interlocking clasp are geometrically the same.

11. The device of claim 9, wherein the tensile force necessary to disengage the first interlocking clasp and the second interlocking clasp is 6-24 pounds.

12. The device of claim 9, wherein the first and second protrusions have an arcuate profile.

13. The device of claim 12, wherein the first tab is located on a first inside surface of the first protrusion facing the first planar side of the first body, and wherein the second tab is located on a second inside surface of the second protrusion facing the second planar side of the second body.

14. The device of claim 9, wherein the first planar side of the first body and the second planar side of the second body directly face each other when the first interlocking clasp and the second interlocking clasp are engaged.

15. The device of claim 9, wherein the resilient material comprises one or more of an amorphous polymer or a semi-crystalline polymer.

16. The device of claim 9, wherein the first protrusion is connected to the first body at the proximal end of the first body, and wherein the second protrusion is connected to the second body at a proximal end of the second body.

* * * * *